Feb. 29, 1944.   B. L. MILLER   2,343,072
LAWN MOWER SHARPENER
Filed Aug. 29, 1941

BRUCE L. MILLER
INVENTOR.

BY
ATTORNEY

Patented Feb. 29, 1944

2,343,072

UNITED STATES PATENT OFFICE 2,343,072

LAWN MOWER SHARPENER

Bruce L. Miller, Detroit, Mich.

Application August 29, 1941, Serial No. 408,885

3 Claims. (Cl. 51—263)

This invention relates to rotary cutting blades, such, for instance, as are found in lawn mowers and has for its object to provide an improved method and means of sharpening the same.

Lawn mowers and similar rotary cutting tools are provided with a series of blades each of which may follow a spiral or other curved path. A cutter plate is placed adjacent the rotary path of the cutters in order that grass or other material may be sheared when inserted in front of the plate and in the path of the blades. It has been known for many years that this cutter plate may be adjusted so that each blade will make contact therewith throughout its length and that a certain amount of sharpening will result therefrom by the resultant metal to metal abrasion. However, the sharpening action is very imperfect and the results leave much to be desired. Improvements over this method have been suggested in the form of various pasty-like abrasives which are intended to be applied to the blades by hand but these attempts are not considered successful.

I have discovered that this latter method fails of success by reason of the failure to obtain uniformity of distribution of the abrasive over the cutting edges of the blades and that if uniformity of distribution of a proper abrasive is obtained that vastly improved results may be expected. I have found also that the desired uniformity is very difficult to obtain by hand smearing, but that it is possible to obtain it with acceptable certainty by a proper mechanical device.

It is, therefore, an object of this invention to provide means attachable to a lawn mower for automatically applying a suitable amount of abrasive to the cutter blades thereof, the application being uniform along the length of said blades.

Another object is to provide a device of the type described which will receive and retain a predetermined amount of abrasive and to which the abrasive may be applied very easily by the inexperienced.

More specifically, it is an object of this invention to provide means in the form of a spring pressed roller for applying abrasive to cutter blades, the roller having a surface with a multiplicity of indentations therein, each of which is adapted to be filled with abrasive material.

Another object is to provide simple and economical means for attaching and detaching the roller to a lawn mower.

Other objects and advantages will become more fully apparent as reference is had to the accompanying drawing wherein the invention is illustrated, and in which.

Figure 1:
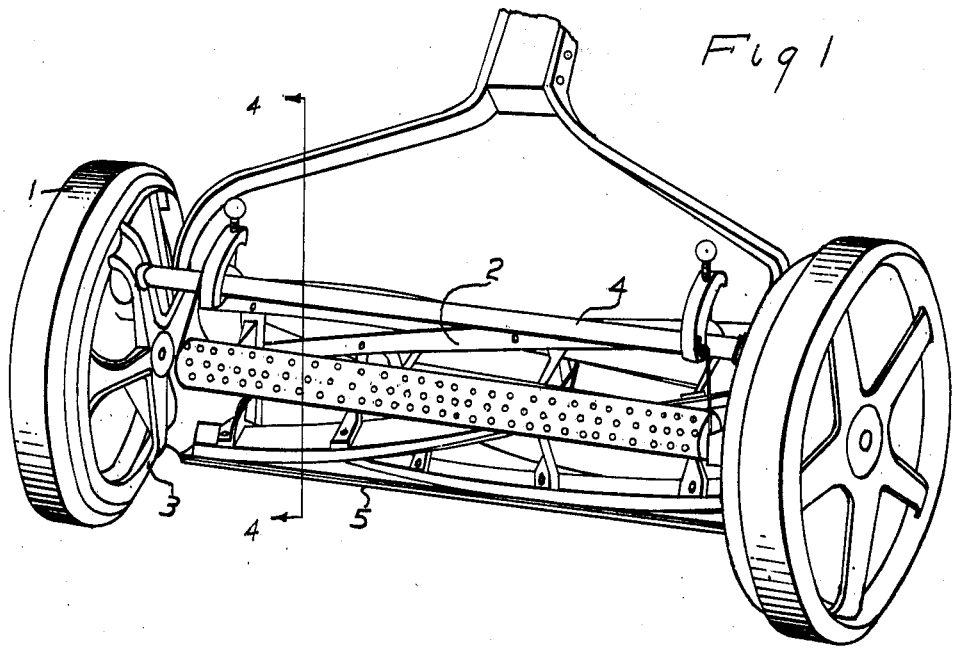
Fig. 1 is a perspective view of my device as applied to a lawn mower to be sharpened.
Figure 2:
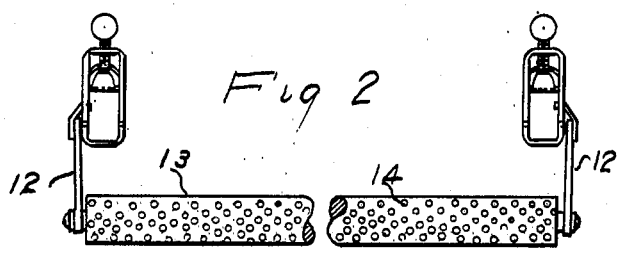
Fig. 2 is a plan view of my device.
Figure 3:
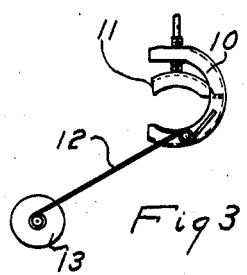
Fig. 3 is an end view thereof.
Figure 4:
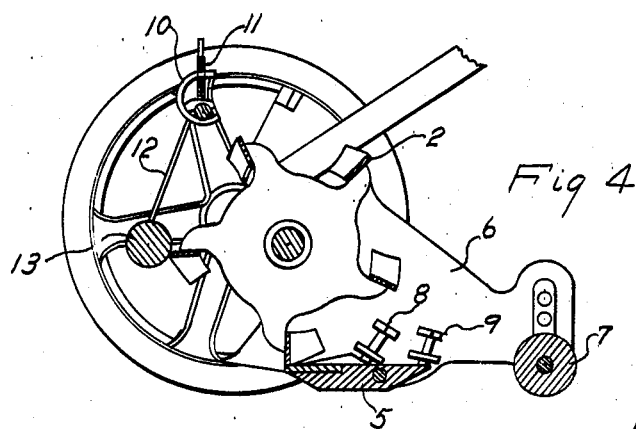
Fig. 4 is a sectional view taken on line 4—4 of Fig. 1.

More particularly, I indicates the wheels of a lawn mower having the usual spiral shaped cutter blades 2 which form the reel. The reel is mounted for rotation through gearing by said wheels. The stationary members of the mower consist essentially of side frames 3 which are connected by a cross bar 4 and by a cutter plate or bed knife 5. Extending rearwardly between the end of the reel and the wheels are extensions 6 of the side frames. Connecting the outer ends of the two extensions 6 is a positioning roller 7 and connecting the inner ends thereof is the cutter plate 5 which is adjustable thereon by means of set screws 8 and 9.

In ordinary operation the cutter blades 2 rotate through a circle from which the cutter plate 5 is slightly spaced.

My invention consists in the method and means for sharpening the cutting edges as will now be described. Attached to the cross bar 4 at spaced points are two clamps 10 composed of C-shaped channel members having a clamping screw and pad 11 by which they may be firmly secured to the cross bar simply by manual pressures. Secured to each clamp 10 is a spring wire 12 which is attached at its outer end to a roller 13. The roller is preferably of some soft material such as wood in the surface of which a multiplicity of small indentations 14 have been impressed. The clamps 10 and springs 12 are rotated toward the cutters to the extent that they cause the roller to exert a pressure against the cutter blades 5 with which it contacts.

The roller 13 has its surface covered and its indentations 14 filled with an abrasive so that as the cutter blades pass the roller it rotates and at the same time wipes an amount of abrasive on the edge of each thereof. If the roller has been mounted so as to exert uniform pressure along the blades the abrasive will be wiped on the blades uniformly. With this setting and before rotation is actually begun the bed knife is adjusted by the set screws 8 and 9, so that it will actually contact the blades 2. The setting should be such as to give uniform contact along the entire length.

With the above preparation the mower is then pushed along a smooth surface such as a cement sidewalk or along a garage floor for about five minutes whereupon the cutting edges will be found to be sharp. The bed knife 5 is then backed away to its original position.

In preparing the roller for re-use an abrasive in paste form should be made up or purchased and a small amount smeared on a smooth surface, as, for instance, on a piece of paper. The roller is then rolled thereon to fill all indentations 14 whereupon it is re-mounted and again ready for use as an abrasive applying means.

It will be obvious to those of mechanical mind that small changes may be made without departing from the spirit of my invention and I, therefore, desire to be extended protection as defined by the appended claims.

What is claimed is:

1. An abrasive applying means for a lawn mower reel comprising a wooden roller having a multiplicity of indentations in the surface thereof, said indentations containing abrasive in paste form, and spring means urging said roller into pressure contact with the cutting edges of said reel, said roller being freely rotatable and adapted to be rotated by the reel.

2. An abrasive applying means for a lawn mower reel comprising a wooden roller having a multiplicity of indentations in the surface thereof, said indentations containing abrasive in paste form, clamps for attachment of the roller to the cross bar of the mower, and spring means depending from said clamps for supporting said roller from said clamps, said roller being freely rotatable with respect to said clamps, said clamps being adapted to support said roller parallel to the axis of said reel.

3. The combination of a lawn mower having a reel and a cross bar, and an abrasive applying means for said reel comprising a wooden roller having a multiplicity of indentations in the surface thereof, abrasive material in paste form in said indentations, spaced clamps on said cross bar and spring means attached to said clamps and rotatively supporting said roller, said spring means urging said roller into uniform pressure contact with the cutting edges of said reel whereby abrasive is wiped thereon during rotation of said reel and said roller, said roller being rotated by contact with said reel whereby the wiping contact between the roller and reel constantly changes.

BRUCE L. MILLER.